United States Patent
Glässer et al.

(10) Patent No.: US 8,403,605 B2
(45) Date of Patent: Mar. 26, 2013

(54) PLUNGE MILLING METHOD

(75) Inventors: Arndt Glässer, Dachau (DE); Stefan Heinrich, Adelshofen (DE)

(73) Assignee: MTU Aero Engines GmbH, Munich (DE)

( * ) Notice: Subject to any disclaimer, the term of this patent is extended or adjusted under 35 U.S.C. 154(b) by 1167 days.

(21) Appl. No.: 12/269,422

(22) Filed: Nov. 12, 2008

(65) Prior Publication Data

US 2009/0148251 A1    Jun. 11, 2009

(30) Foreign Application Priority Data

Dec. 11, 2007   (DE) .......................... 10 2007 059 568

(51) Int. Cl.
*B23C 1/00* (2006.01)
*B23C 3/18* (2006.01)

(52) U.S. Cl. ......... 409/132; 409/193; 409/80; 29/889.7; 700/178

(58) Field of Classification Search .................... 409/80, 409/84, 131, 132, 193, 195; 29/889.7; 700/173, 700/178, 184, 190
See application file for complete search history.

(56) References Cited

U.S. PATENT DOCUMENTS

| | | | | |
|---|---|---|---|---|
| 4,489,377 A | * | 12/1984 | Mawyer et al. | 700/178 |
| 5,003,484 A | * | 3/1991 | Vollmayr | 409/99 |
| 5,107,436 A | * | 4/1992 | Levine et al. | 700/186 |
| 5,122,966 A | * | 6/1992 | Jansen et al. | 700/178 |
| 6,077,002 A | * | 6/2000 | Lowe | 409/132 |
| 6,991,434 B2 | * | 1/2006 | Heinrich et al. | 416/241 R |
| 7,637,010 B2 | * | 12/2009 | Burgess et al. | 29/889.23 |
| 7,832,968 B2 | * | 11/2010 | Glaesser | 409/132 |
| 2001/0048857 A1 | * | 12/2001 | Koch | 409/132 |
| 2007/0124933 A1 | * | 6/2007 | Burgess et al. | 29/889.7 |
| 2009/0148251 A1 | * | 6/2009 | Glasser et al. | 409/132 |
| 2010/0074704 A1 | * | 3/2010 | Rozic et al. | 409/141 |

* cited by examiner

*Primary Examiner* — David B Jones
(74) *Attorney, Agent, or Firm* — Greer, Burns & Crain, Ltd.

(57) ABSTRACT

A plunge milling method includes: a) the area of material that is to be removed is enclosed by a plurality of milling paths, each milling path defining end positions of a milling head during the formation of plunge milling bores; b) to each milling path there is allocated a guide curve for the tool axis, each guide curve defining initial positions of the milling head during the formation of plunge milling bores; c) during the formation of plunge milling bores, the tool axis is oriented, as a function of a milling path and the respective guide curve, so that there is no danger of collision of the milling tool with a contour formed by plunge milling; d) for each milling path, bore axes for plunge milling bores are determined as a function of the respective guide curve, corresponding to a pre-specified overlap of milling bores formed along the milling paths.

5 Claims, 1 Drawing Sheet

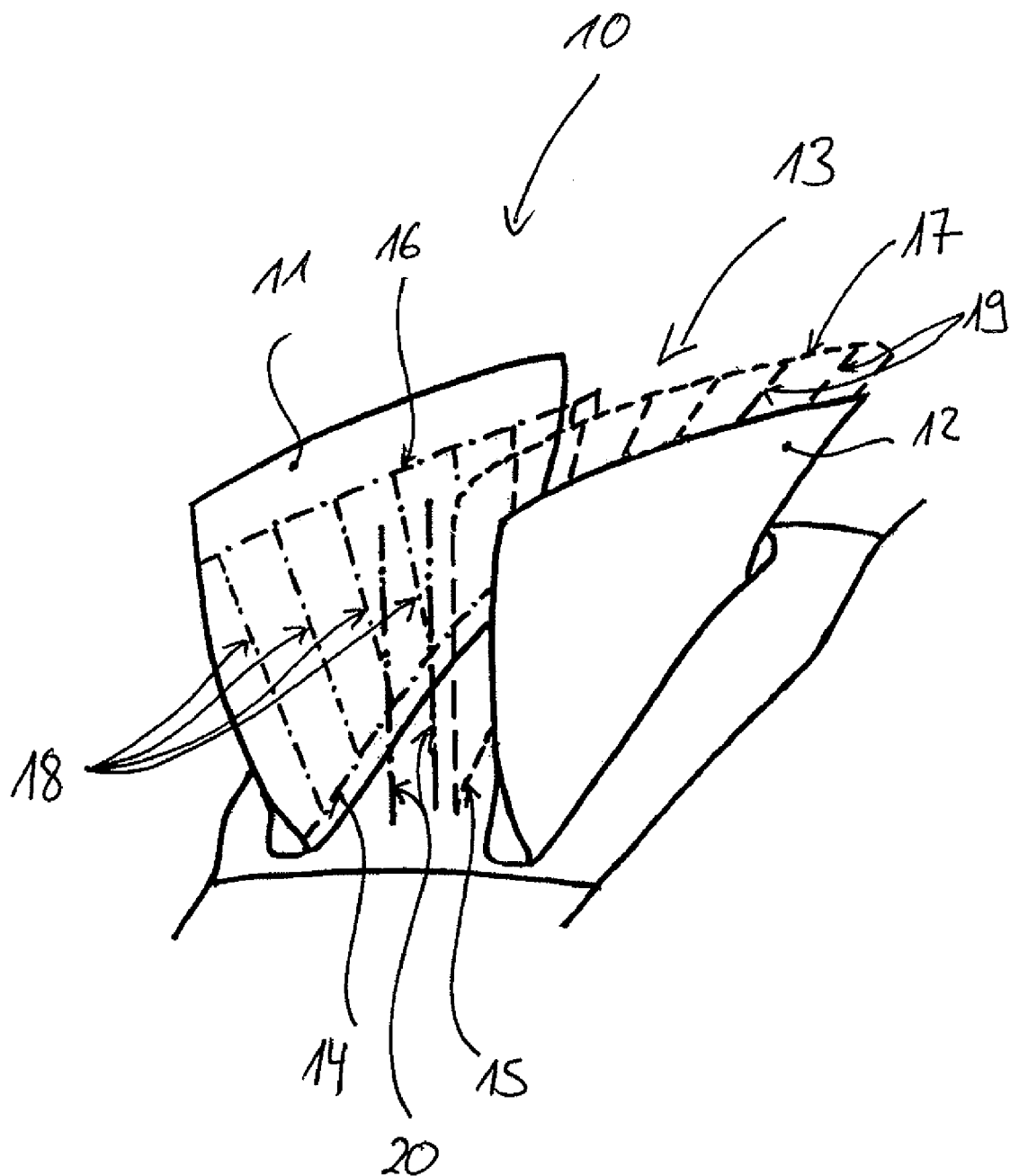

PLUNGE MILLING METHOD

BACKGROUND

In the manufacture of gas turbine components, in particular in the manufacture of gas turbine rotors having integral blades, milling is often used as a manufacturing method. A basic distinction is made between what is known as path milling and what is known as plunge milling. In path milling, a milling tool is moved relative to a workpiece that is to be processed, along a tool path or milling path that extends essentially perpendicular to a tool axis or tool vector of the milling tool. In contrast, in plunge milling a milling tool is moved multiple times in succession in the direction of its tool axis or its tool vector, into an area of material that is to be removed, forming milling bores, and is subsequently moved out of this area. The present invention relates to plunge milling.

In plunge milling, each plunge movement of the milling tool must be defined individually. In particular when forming complex contours, the defining of the plunge movements presents difficulties. There is therefore a need for a plunge milling method with which plunge movements for the plunge milling can be generated at a low expense within a short time.

SUMMARY

On this basis, the present invention is based on the problem of creating a new kind of plunge milling method.

This problem is solved by a plunge milling method as recited in claim 1. The plunge milling method according to the present invention comprises at least the following steps: a) the area of material of the workpiece that is to be removed is defined or enclosed by a plurality of milling paths, each milling path defining end positions of a milling head or of a tool reference point of the milling tool during the formation of plunge milling bores; b) to each milling path there is allocated a guide curve for the tool axis or the tool vector of the milling tool, each guide curve defining initial positions of the milling head or of the tool reference point during the formation of plunge milling bores; c) during the formation of plunge milling bores, the tool axis or tool vector is oriented, as a function of a milling path and the respective guide curve, in such a way that there is no danger of collision of the milling tool with a contour that is to be formed by plunge milling; d) for each milling path, bore axes for plunge milling bores are determined as a function of the respective guide curve, corresponding to a prespecified degree of overlap of plunge milling bores that are to be formed along the milling paths during the plunge milling.

With the plunge milling method according to the present invention, bore axes can be provided for plunge milling bores, and thus plunge movements can be provided for plunge milling with a low expense within a short period of time. This permits a significantly more effective plunge milling of workpieces.

Preferred developments of the present invention result from the subclaims and from the following description. Exemplary embodiments of the present invention are described in more detail on the basis of the drawing, without being limited thereto.

BRIEF DESCRIPTION OF THE DRAWINGS

FIG. 1 shows a representation illustrating the plunge milling method according to the present invention.

DETAILED DESCRIPTION

The present invention relates to a plunge milling method for the cutting removal of an area of a workpiece. In the following, the plunge milling method according to the present invention is described in detail with reference to FIG. 1, which shows a segment of a gas turbine rotor 10 having integral blades that is to be manufactured, in the area of two adjacent rotor blades 11, 12.

Using plunge milling, a material area 13 situated between adjacent rotor blades 11, 12 is to be removed by cutting. In the plunge milling method according to the present invention, material area 13 that is to be removed by cutting is defined or enclosed by a plurality of milling paths, namely, in the exemplary embodiment shown in FIG. 1, by two milling paths 14, 15, each milling path 14, 15 defining end positions of a milling head or of a tool reference point of the milling head during the formation of plunge milling bores.

To each milling path 14, 15 there is allocated a respective guide curve 16, 17 for a tool axis or tool vector of the milling tool. Here, each guide curve 17, 18 defines initial positions of the milling head or of the tool reference point during the formation of plunge milling bores.

During the formation of the plunge milling bores, the tool axis or tool vector of the milling tool is oriented as a function of a milling path 14 or 15 and of the respective guide curve 16 or 17 in such a way that there is no danger of collision of the milling tool with a contour that is to be formed by plunge milling in the area of rotor blades 11, 12.

Corresponding to a prespecified degree of overlap of the plunge milling bores that are to be formed by plunge milling along milling paths 14 or 15, for each milling path 14, 15 bore axes 18 or 19 for plunge milling bores are determined as a function of the respective guide curve 16 or 17. Bore axes 18 are determined as a function of milling path 14 and of guide curve 16, and bore axes 19 are determined as a function of milling path 15 and of guide curve 17.

In addition, corresponding to a prespecified degree of overlap of plunge milling bores that are to be formed between milling paths 14, 15 during the plunge milling, additional bore axes 20 are determined by interpolation between bore axes 18 and 19.

The degree of overlap of the plunge milling bores along milling paths 14 or 15 and the degree of overlap of the plunge milling bores between milling paths 14 and 15 may be identical. Alternatively, it is also possible for the degree of overlap of the plunge milling bores along milling paths 14 and 15 to deviate from the degree of overlap of the plunge milling bores between milling paths 14 and 15.

On the basis of the bore axes determined in this way for the plunge milling bores, travel paths can be generated for the milling tool, so that plunge movements can be generated for the milling tool for the plunge milling method.

The invention claimed is:

1. A plunge milling method for removal of an area of material of a workpiece utilizing a milling tool that is moved multiple times into the material area to remove the material, the method comprising:
   a) defining the area of material of the workpiece that is to be removed by a plurality of milling paths, each of the milling paths defining end positions of a milling head of the milling tool for forming plunge milling bores;
   b) determining a guide curve for each of the milling paths, each of the guide curves defining initial positions of the milling head during the formation of the plunge milling bores;

c) orienting the milling tool based on one of the milling paths and its respective guide curve such that the milling tool will not collide with a contour to be formed on the workpiece; and
d) determining bore axes for the plunge milling bores associated with each of said milling paths and respective guide curves, the bore axes corresponding to a prespecified degree of overlap of the plunge milling bores that are to be formed along the milling paths.

2. The plunge milling method as recited in claim 1, further comprising determining additional bore axes for plunge milling bores formed between the milling paths by interpolation, the additional bore axes corresponding to a prespecified degree of overlap of the plunge milling bores formed between the milling paths.

3. The plunge milling method as recited in claim 2, wherein the degree of overlap of the plunge milling bores along the milling paths corresponds to the degree of overlap of the plunge milling bores between the milling paths.

4. The plunge milling method as recited in claim 2, wherein the degree of overlap of the plunge milling bores along the milling paths deviates from the degree of overlap of the plunge milling bores between the milling paths.

5. The plunge milling method as recited in claim 1, wherein travel paths for the milling tool are generated based on the determined bore axes.

* * * * *